United States Patent
Purcell et al.

(10) Patent No.: US 10,757,874 B2
(45) Date of Patent: Sep. 1, 2020

(54) SELF WATERING PLANTER ASSEMBLY

(71) Applicants: Andrew Purcell, Cobleskill, NY (US); William Purcell, Cohoes, NY (US)

(72) Inventors: Andrew Purcell, Cobleskill, NY (US); William Purcell, Cohoes, NY (US)

( * ) Notice: Subject to any disclaimer, the term of this patent is extended or adjusted under 35 U.S.C. 154(b) by 178 days.

(21) Appl. No.: 15/791,477

(22) Filed: Oct. 24, 2017

(65) Prior Publication Data
US 2018/0368342 A1    Dec. 27, 2018

Related U.S. Application Data

(60) Provisional application No. 62/412,848, filed on Oct. 26, 2016.

(51) Int. Cl.
*A01G 27/00* (2006.01)

(52) U.S. Cl.
CPC ......... *A01G 27/008* (2013.01); *A01G 27/001* (2013.01); *A01G 27/003* (2013.01); *A01G 27/005* (2013.01)

(58) Field of Classification Search
CPC .. A01G 27/001; A01G 27/003; A01G 27/005; A01G 27/008; A01G 25/16; A01G 31/042
USPC .......................................................... 47/48.5
See application file for complete search history.

(56) References Cited

U.S. PATENT DOCUMENTS

| | | | | |
|---|---|---|---|---|
| 3,542,069 A * | 11/1970 | Ollison | ................ | A01G 27/001 137/624.21 |
| 5,315,787 A * | 5/1994 | Schleicher | ........... | A01G 27/003 222/66 |
| 5,782,035 A * | 7/1998 | Locke | .................... | A01G 27/00 47/79 |
| 5,918,415 A * | 7/1999 | Locke | .................... | A01G 27/00 119/74 |
| 6,226,921 B1 | 5/2001 | Kang | | |
| 7,201,333 B2 * | 4/2007 | Yoshikawa | .......... | A01G 25/165 239/145 |
| 7,222,454 B1 * | 5/2007 | Chen | .................... | A01G 27/003 47/48.5 |
| 8,033,050 B2 | 10/2011 | Matlen | | |
| 8,210,447 B2 * | 7/2012 | Cohen | .................... | B05B 17/08 239/17 |
| 8,769,870 B2 | 6/2014 | Schutter et al. | | |
| 10,104,844 B2 * | 10/2018 | Caceres | ............. | A01G 27/001 |
| 2004/0195372 A1 * | 10/2004 | Yoshikawa | .......... | A01G 27/003 239/310 |

(Continued)

*Primary Examiner* — Claude J Brown
(74) *Attorney, Agent, or Firm* — Andrew Morabito

(57) ABSTRACT

A self-controlling watering system, comprising a water reservoir having a first end, a second end, and an internal compartment of a predetermined volume, a first cover designed to secured to the first end of the tank, a second cover designed to secured to the second end of the tank, wherein the second cover has a first opening, and a second opening, a pump secured to the first cover within the internal compartment of the water reservoir, compartment designed to securely fit within the first opening of the second cover, wherein a third end of the compartment is open and a fourth end of the compartment is closed, a controller positioned within the compartment and for controlling the pump to initiate watering cycles according to a preselected program regarding the frequency of watering and quantity of water.

11 Claims, 7 Drawing Sheets

(56) References Cited

U.S. PATENT DOCUMENTS

| | | | |
|---|---|---|---|
| 2007/0157512 A1* | 7/2007 | Wein | A01G 25/167 47/48.5 |
| 2007/0287389 A1* | 12/2007 | Pockat | H04B 1/03 455/73 |
| 2008/0072492 A1* | 3/2008 | Olson | A01G 27/003 47/79 |
| 2008/0092440 A1* | 4/2008 | Johnson | A01G 13/0212 47/48.5 |
| 2008/0302002 A1* | 12/2008 | Schmidt | A01G 25/167 47/48.5 |
| 2009/0293354 A1* | 12/2009 | Goldberg | A01G 27/003 47/66.6 |
| 2009/0320363 A1* | 12/2009 | Matlen | A01G 27/006 47/65 |
| 2010/0031982 A1* | 2/2010 | Hornsby | E03D 9/005 134/169 R |
| 2010/0064581 A1* | 3/2010 | Johnson | A01G 27/008 47/79 |
| 2010/0175318 A1 | 6/2010 | Ahmadi | |
| 2010/0199555 A1* | 8/2010 | Pole | A01G 27/005 47/62 R |
| 2011/0281149 A1* | 11/2011 | Hutchings | H01M 2/105 429/99 |
| 2012/0083929 A1 | 4/2012 | Conrad | |
| 2013/0145975 A1* | 6/2013 | Irving | B63B 13/00 114/183 R |
| 2013/0205662 A1* | 8/2013 | Yancey | A01G 27/02 47/66.6 |
| 2016/0326765 A1* | 11/2016 | Barbret | E04H 15/02 |
| 2017/0042101 A1* | 2/2017 | Soltani | A01G 27/003 |
| 2017/0112080 A1* | 4/2017 | Ewer | A01G 25/165 |
| 2018/0007848 A1* | 1/2018 | Hohmann | A01G 27/02 |

\* cited by examiner

SELF WATERING PLANTER ASSEMBLY

BACKGROUND

The present invention relates generally to the device to water planters, and more particularly to a self-watering and automated watering system.

People enjoy having plants as a part of their surroundings, but depending upon their location, plants may require a lot of maintenance. Also, in heated and air-conditioned buildings, humidity is generally low, and more frequent watering of indoor plants is typically needed. Furthermore, indoor temperature, sunlight level, air drafts, and positioning near a door that subjects a plant to frequently changing local conditions, can have a significant effect on a plant's need for water, and lead to additional time spent on planter monitoring and/or maintenance. Container-grown plants that are located outdoors and in patio areas can be subjected to even more variation in ambient temperature, sunlight level, and air movement, all of which will affect plant moisture requirements.

It is necessary to provide water and plant food to a plant's soil to properly care for them. Many water devices have been developed where the owner must carry the water and/or plant food to the pot each time the plant needs water and/or plant food. The house watering plant is normally watered via a pitcher, which requires the person to be home and remember to water the plant. Many people travel a lot and are very busy so they may not have time to water their plants often.

Thus, it is desired by the present invention to provide a means of eliminating the daily labor that would otherwise be needed to keep container-grown plants and flowers properly irrigated for a significantly longer self-watering time period than is obtainable from most prior art self-watering systems in current use today for container-grown plants. While irrigation devices and systems are known, none are known that are versatile, self-powered, and adjustable.

SUMMARY

An embodiment of the current invention includes a self-controlling watering system, comprising, a water reservoir having a first end, a second end, and an internal compartment of a predetermined volume, a first cover designed to secured to the first end of the tank, a second cover designed to secured to the second end of the tank, wherein the second cover has a first opening, and a second opening, a pump secured to the first cover within the internal compartment of the water reservoir, a hose of a predetermined length having a first end and a second end and the first end is attached to the pump which passes through the first opening of the second cover, a renewable energy gathering device secured to the second cover, a compartment designed to securely fit within the first opening of the second cover, wherein a third end of the compartment is open and a fourth end of the compartment is closed, a controller positioned within the compartment and for controlling the pump to initiate watering cycles according to a preselected program regarding the frequency of watering and quantity of water, and a battery positioned within the compartment and electrically connected to the renewable energy gathering device and the controller.

In an additional embodiment, the current invention includes a self-controlling watering system, comprising, a water reservoir having a first end, a second end, and an internal compartment of a predetermined volume and a plurality of openings on the first end, a pump secured within the internal compartment of the water reservoir substantially at the second end, a hose extending from one of the plurality of openings on the first end of the water reservoir and connected to the pump, a renewable energy gathering device secured to the first end of the water reservoir, a compartment affixed to the water reservoir distal to the first end, a controller positioned within the compartment to control the pump; and a battery positioned within the compartment and electrically connected to the renewable energy gathering device and the controller.

DETAILED DESCRIPTION

The present invention relates to a watering apparatus which is attachable to various planters and provides a self-monitoring watering system. The apparatus has an integrated water storage tank, a computing device to monitor, detect, and manage the watering apparatus and an energy source so that the apparatus is self-sufficient and potentially only requires the user to add additional water to the tank. The rest of the apparatus is automatically monitored.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
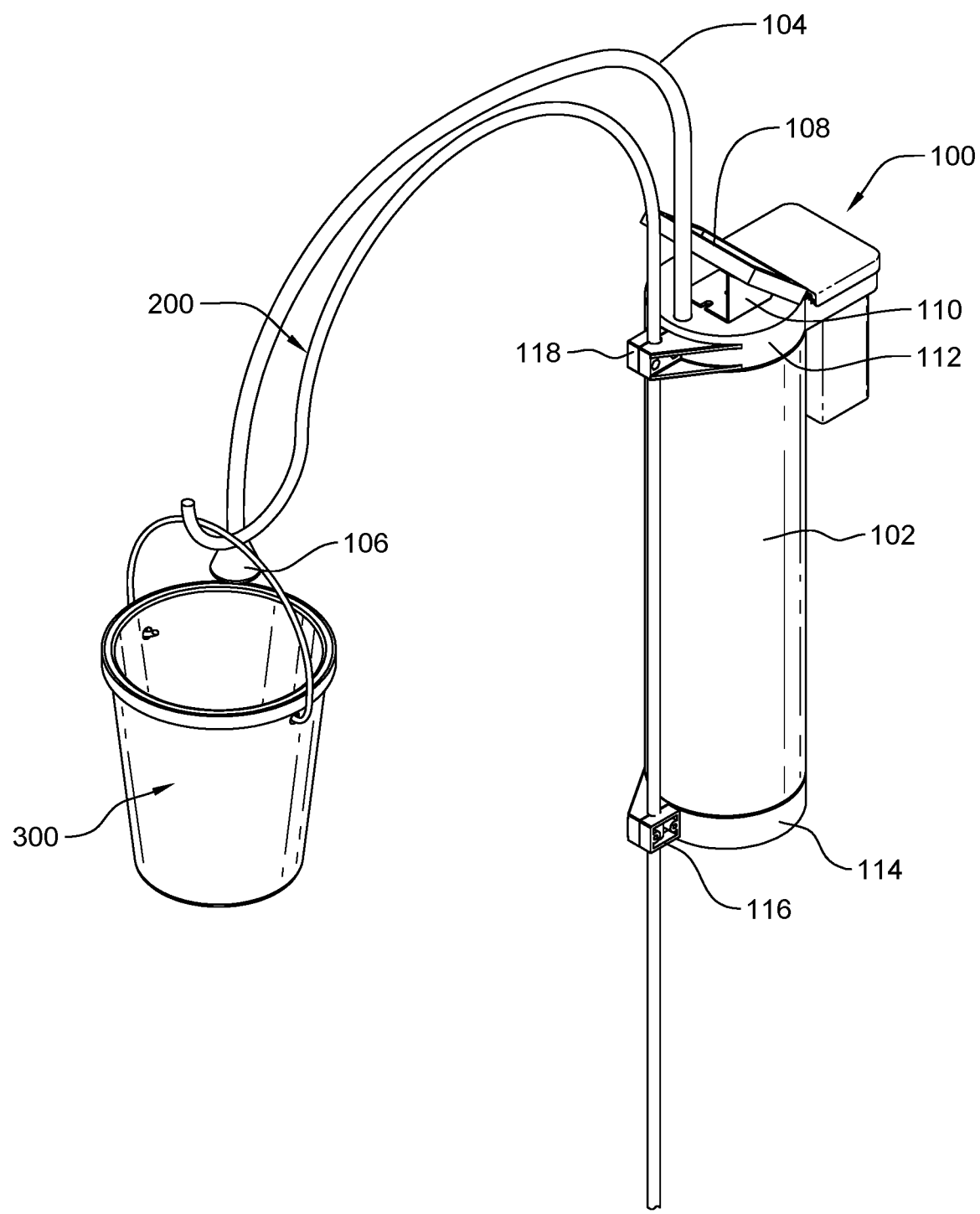
FIG. 1 depicts a perspective view of a watering apparatus attached to a Shepard hook planter holder, in accordance with one embodiment of the present invention.

FIG. 1 depicts a perspective view of a watering apparatus 100 attached to a Shepard hook planter holder 200, in accordance with one embodiment of the present invention. The watering apparatus 100 is attached to the Shepard hook planter holder 200. A hose 104 extends out of an opening in the watering apparatus and has a nozzle 106 which is then positioned over or within a planter 300 to provide the water or nutrients to the plant(s). The watering apparatus 100 is secured to the Shepard hook planer holder 200 via an adjustable attachment means (which is explained in detail below) so the watering apparatus 100 can be positioned in the desired position, and an acceptable position so the at the hose 104 can extend to provide the water or nutrients to the planter 300. Various attachment means, may be employed to accommodate different thickness of the Shepard hook planter holder 200, or other types of planter holders, so that the watering apparatus 100 may be secured to the holder(s).

The body of the watering apparatus 100 is comprised of a tank body 102, a tank top 112, and a tank bottom 114. The body is designed to hold a predetermined quantity of water so that the watering apparatus 100 can operate for an extended period of time and the user does not have to refill the body as often as one would normally have to water the planter 300. In one embodiment, the tank body 102 can hold 16 ounces of water. The tank body 102 is designed to be substantially water tight. The tank body 102 may have various shapes and sizes. In the depicted embodiment, the tank body 102 is a cylindrical shape. In one embodiment, the tank body 102 is designed to hold 16 ounces of water.

The tank top 112 is designed to securely fit over the tank body 102 and create a water tight seal between the tank top 112 and the tank body 102. In some embodiments, the tank top 112 is removable from the tank body 102. In additional embodiments, the tank top 112 and the tank body 102 are a unitary element. The tank top 112 has a plurality of openings (not shown) to allow for the hose 104 to connect to a pump 124 (not shown), for a solar panel mount 110 to be secured to the tank top 112, and to secure the electronic controls compartment 120. The water tight seal may be formed from a pressure fit between the elements, or there may be an adhesive or locking mechanism to assist in creating the substantially water tight seal.

The tank bottom 114 is designed to securely fit over the tank body 102 and create a water tight seal. In some embodiments, the tank bottom 114 is removable from the tank body 102. In additional embodiments, the tank bottom 114 and the tank body 102 are a unitary element. In some embodiments, the internal surface of the tank bottom 114 is sized and shaped to securely hold the pump 124. The water tight seal may be formed from a pressure fit between the elements, or there may be an adhesive or mechanism to assist in creating the substantially water tight seal.

The hose 104 is a hollow malleable tubing that is inserted into the tank top 112 through an opening (not shown) and secured to a pump 124 (not shown) so that the water from the tank body 102 can be transferred from the tank body 102 and into the plant holder 300. The length and diameter of the hose 104 is dependent upon the application of the water apparatus 100 and the plant holder 300 which the water apparatus 100 is attached to. The hose 104 may be made from various plastics or metals. In some embodiments, the hose 104 may be extendable, having an accordion style design. In some embodiments, the hose 104 may have a rigid design.

The nozzle 106 is designed to disperse the water from the hose 104 to cover a greater area. The nozzle 106 may have various designed, or styles based on the application to allow for a greater coverage of the plant holder 300 to provide adequate watering or nutrients distribution. The nozzle 106 may have a solid stream or may have a plurality of perforations in the nozzle 106. In some embodiments, the nozzle 106 may be removable from the hose 104 to allow for replacement and maintenance.

A solar panel 108 is used to produce adequate energy to power the internal electrical and mechanical components. In the shown embodiment, the solar panel 108 is attached to the watering apparatus 100, to provide additional energy to charge a battery (not shown) or to power the pump 124 (not shown). The solar panel 108 may be various types of solar panels known to those skilled in the art, such as, but not limited to, amorphous silicon, cadmium telluride, copper indium gallium selenide, organic photovoltaic cells, or the like. In various embodiments, the solar panel 108 may be positioned on various parts of the watering apparatus 100 and positioned at various angles. In various embodiment, renewable power sources may be employed by the watering apparatus 100, such as, but not limited to, fans or the like. Provided they are able to produce adequate power to efficiently power the watering apparatus' 100 components. The solar panel 108 is of a predetermined size to gather adequate energy to power the watering apparatus 100.

Figure 2:
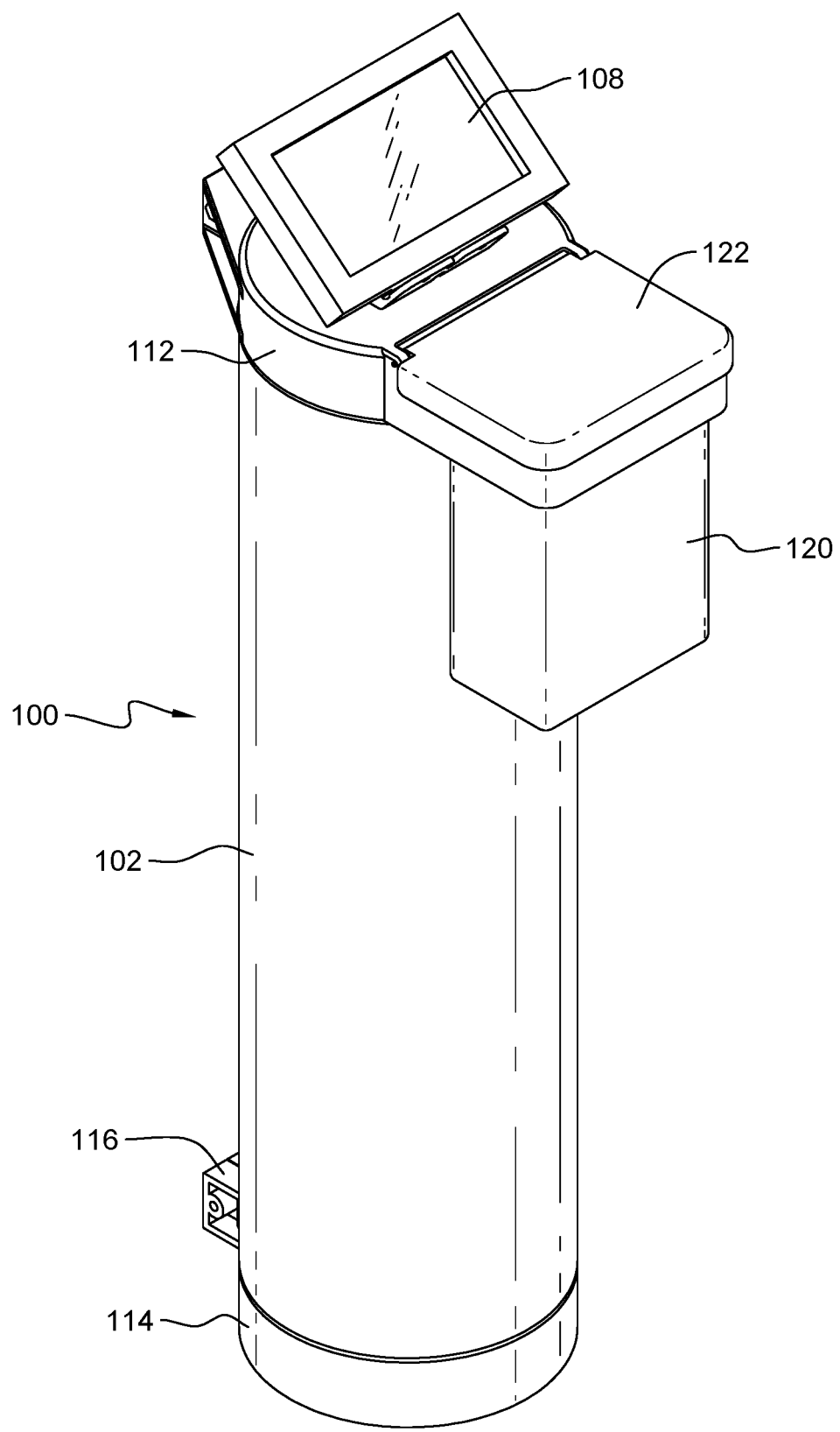
FIG. 2 depicts a second perspective view of the watering apparatus, in accordance with an embodiment of the present invention.

FIG. 2 depicts a second perspective view of the watering apparatus 100, in accordance with an embodiment of the present invention.

In the depicted embodiment, a clamp 116 is shown secured to the tank bottom 114 and clamp 118 is shown secured to tank top 112. The tank top 112 and tank bottom 114 are designed to substantially mate with the clamps so that the watering apparatus 100 is secured to the Shepard hook planter holder 200 or the plant holder 300 and maintain the desired position even with a full tank body 102 of water or nutrients. The clamps 116 and 118 may be various sizes, shapes, or designed provided they are able to mate with the tank top 112 or the tank bottom 114 respectively. The clamps 116 and 118 may have various sizes, shapes, be made from various materials to assist in allowing the watering apparatus 100 to securely attached to the Shepard hook planter holder 200 or the plant holder 300 and to remain secured to the planter or plant holder. Various other features such as rough or scuffed surfaces may be employed to increase the friction coefficient of the watering apparatus 100 elements which come in contact with the planter or plant holder. In the depicted embodiment, a screw or other fastening means is used to secure the tank top 112 and the clamp 118 and the tank bottom 114 and the clamp 116 together and are adjustable to allow the user to create the desired tightness to the Shepard hook planter holder 200 or plant pot 300. In some embodiments, the tank top 112, the tank bottom 114, and the clamps 116 and 118 have clips or other fastening mechanism, known to those skilled in the arts, integrated. In some embodiments, the surfaces of the clamps 116 and 118 and the tank top 112 and tank bottom 114 have an adhesive coating or material displaced on the surfaces which come in contact with the Shepard hook planter holder 200 or plant pot 300. In additional embodiments, the surfaces of the of the clamps 116 and 118 and the tank top 112 and tank bottom 114 have a rougher to increase the friction coefficient of the surfaces which come in contact with the Shepard hook planter holder 200 or plant pot 300.

A solar panel mount 110 is designed to secure the solar panel 108 and position the solar panel 108 in a desired position. In the shown embodiment, the solar panel mount 110 is rotatably attached to the tank top 112. The solar panel 108 is removably attached to the solar panel mount 110, and the solar panel mount 110 has a predetermined angle to provide the ideal position to absorb the solar energy. The solar panel mount 110 may be secured to the tank via a screw or pin. In additional embodiments, the solar panel mount 110 is integrated into the tank top 112. In some embodiments, the solar panel mount 110 is motorized and is able to rotate so that the solar panel 108 can be directed at the sun throughout the day to maximize the amount of energy generated, then if it was positioned in a static position. The movement of the solar panel mount 110 requires additional motors and sensors which are not shown in the depicted embodiment, but would be known to those skilled in the art.

Figure 3:
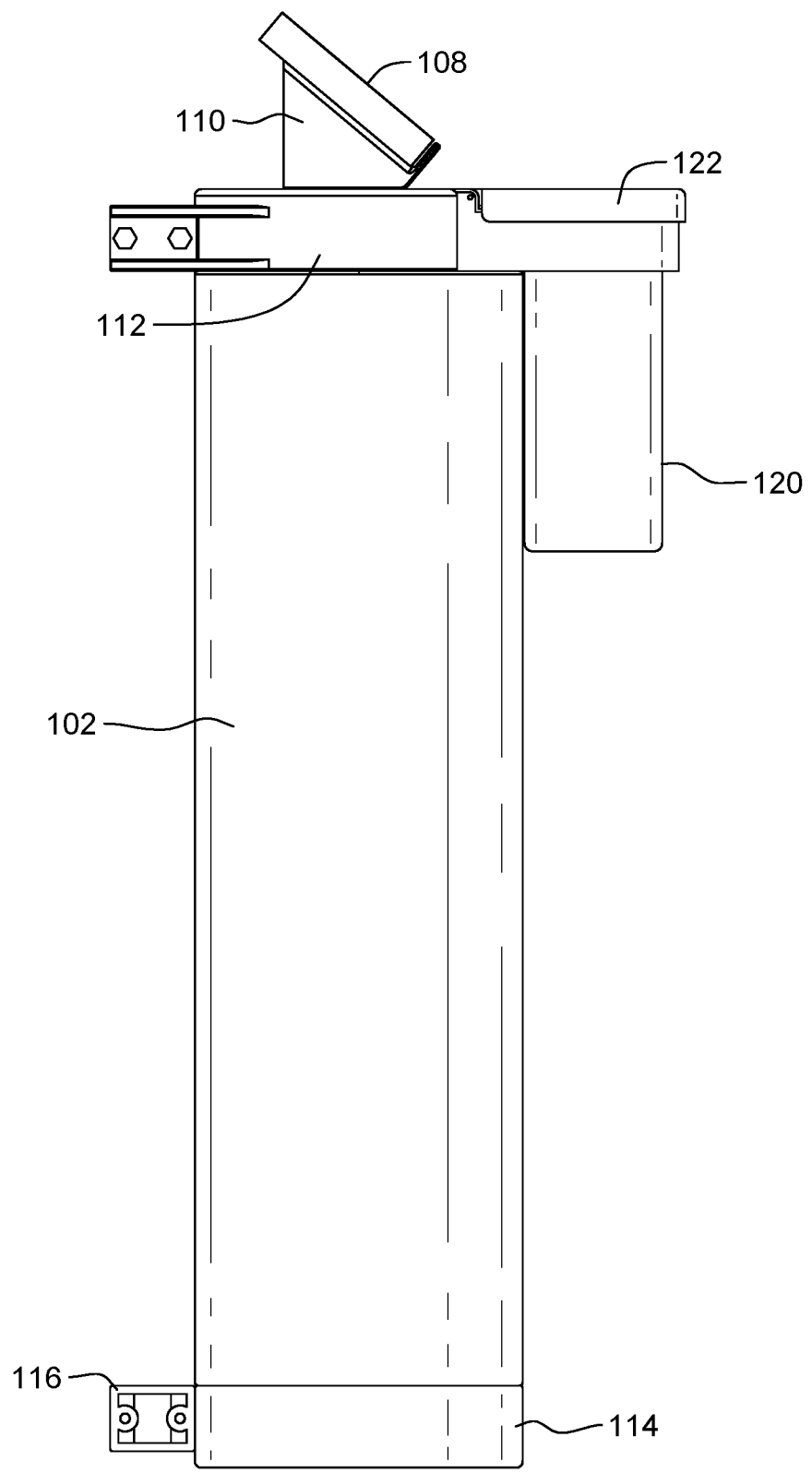
FIG. 3 depicts a side view of a tank top, in accordance with an embodiment of the present invention.
Figure 4:
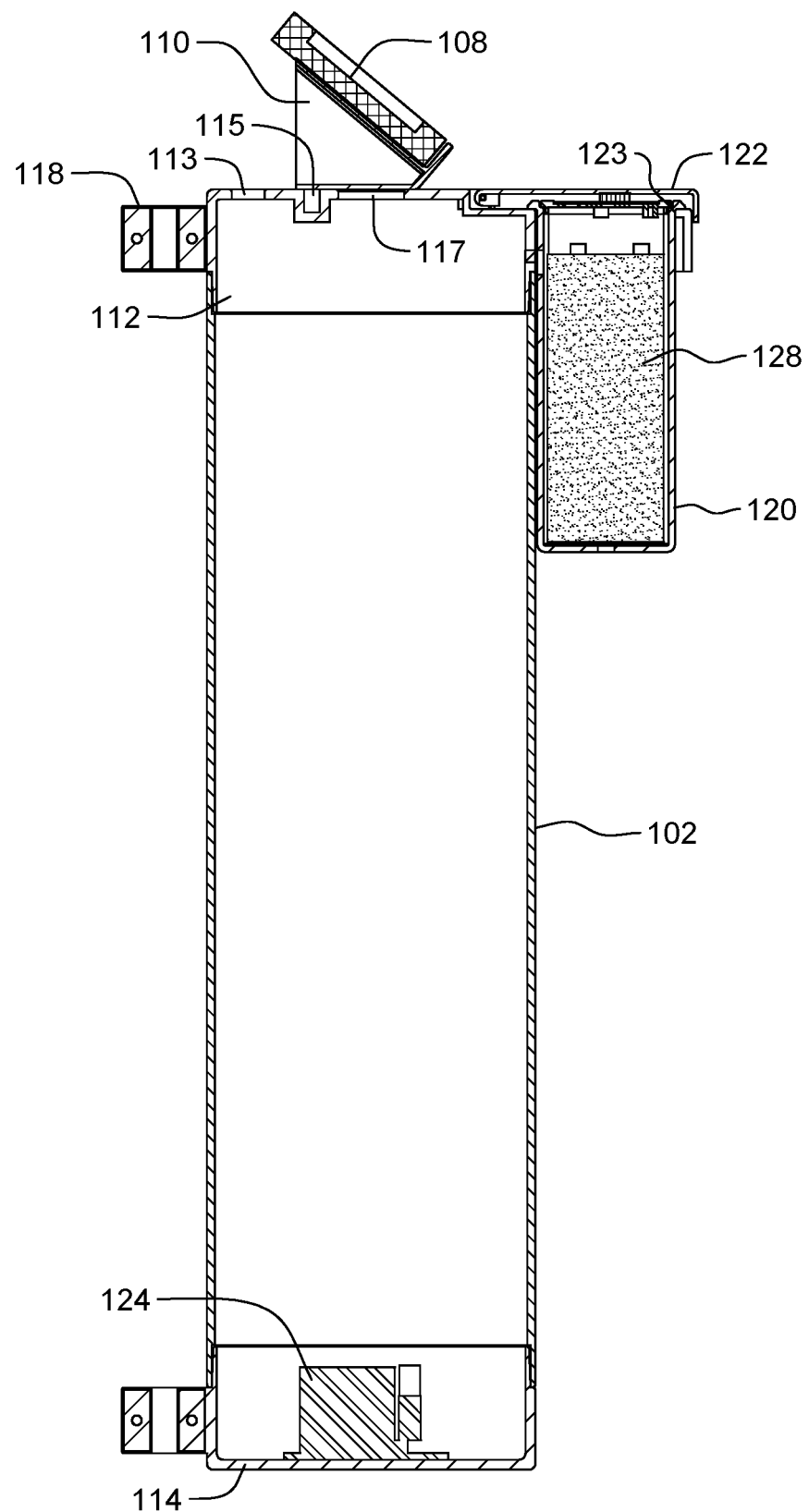
FIG. 4 depict a section view of the water apparatus, in accordance with an embodiment of the present invention.

FIGS. 3 and 4 depicts a side view of the watering apparatus 100 and a section view of the watering apparatus 100 respectively, in accordance with an embodiment of the present invention. The tank top 112 is designed to secure the top end of the tank body 102 and provide adequate entry into the tank body 102 and provide structural support for the electrical component compartment 120. In the depicted embodiment, the tank top 112 has opening 113, cavity 115, opening 117, and opening 123. Opening 113 is designated for and designed to receive the hose 104. Cavity 115 is designed to receive and secure to the fastening means 111 to secure the solar panel mount 110 to the tank top 112. Opening 117 is designed to allow the user to easily fill or refill the tank body 102 without having to remove the tank top 112. In some embodiments, the tank top 112 is removably secured to the tank body 102 to allow for the quick disconnection of the tank top 112 to refill the tank body 102. In the depicted embodiment, the opening 117 is covered by the solar panel mount 110 to reduce the possibility of contaminants getting inside the tank body 102. In additional embodiments, filters or covers may be used to cover the opening 117 if no solar panel mount 110 is covering the opening. Opening 123 is designed to receive the electrical component compartment 120. The opening 123 is designed to allow for a predetermined portion of the electrical component compartment 120 to slide through and remain secured in place. In some embodiments, opening 123 has integrated locating mechanism which mate with a locking mechanism on the electrical component compartment 120. In various embodiments, a portion of these openings may be placed in various and predetermined locations, of predetermined diameters, or may be removed.

The pump 124 is shown secured to the tank bottom 114 as well as the electrical component compartment 120 secured to the tank top 112, with the compartment cover 112 covering substantially the open end of the electrical component compartment 120. The solar panel mount 110 is shown covering the opening 117. The battery 128 is shown encapsulated by the electrical component compartment 120. In additional embodiments, the battery 128 is various sizes and shapes to fit within the electrical component compartment 120 as well as the additional electronic components.

Figure 5:
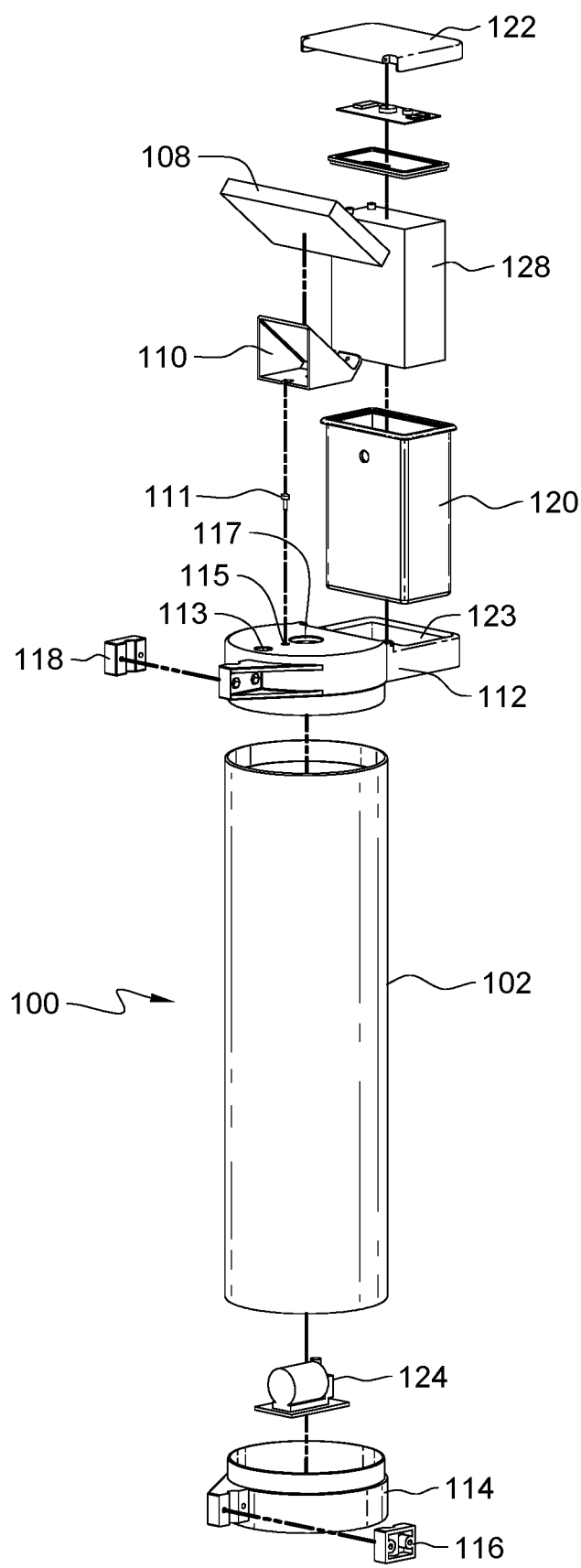
FIG. 5 depicts an exploded view of the watering apparatus, in accordance with an embodiment of the present invention.

FIG. 5 depicts an exploded view of the watering apparatus 100, in accordance with an embodiment of the present invention. In the depicted embodiment, the watering apparatus 100 is comprised of the tank bottom 114, the clamp 116, a pump 124, the tank body 102, the tank top 112, the clamp 118, the solar panel mount 110, the electrical component compartment 120, a compartment cover 122, the solar panel 108, a screw 111.

The electrical component compartment 120 is designed to house all the electronic components (shown in FIG. 7), and provide adequate protection for the electrical components from the elements. The electrical component compartment 120 has a predetermined size and shape to properly house all of the electronic components. In the depicted embodiment, the electrical component compartment 120 slides into an opening in the tank top 112 and is secured in place. The compartment cover 122 is used to cover the open end of the electrical component compartment 120 to further protect the electrical components from the elements. The compartment cover 122 is rotatably secured to the tank top 112. In various embodiments, the tank top 112 and the electrical component compartment 120 are a unitary element. In additional embodiments, the electrical component compartment 120 is permanently secured to the tank top 112.

The compartment cover 122 is designed to substantially cover the opening of the electrical component compartment 120 to protect the contents of the electrical component compartment 120 from the elements. In the depicted embodiment, the compartment cover 122 is attached to the tank top 112 and is able to freely rotate about the attachment point(s) to gain access to the contents of the electrical component compartment 120. In additional embodiments, the compartment cover 122 is fastened to the electrical component compartment 120 and/or the tank top 112 provided the interior of the electrical component compartment 120 is substantially covered. Various forms of snaps, latches, locks, fasteners, or the like may be employed to secure the compartment cover 122. In some embodiments, the compartment cover 122 may have various buttons or screens to allow the user to access, adjust, and calibrate the watering apparatus 100. This can be the timer for when to water, the amount of water at each instance of watering, the volume of water in the tank, etc.

The pump 124 is designed to transfer the water or nutrients by mechanical or electrical means from the tank body 102 through the hose 104 and out the nozzle 106 at a predetermined interval, quantity, and speed. Various sized and powers of the pump 124 may be used provided they are at least able to move the fluid out of the nozzle 106 and into the holder 300. The pump 124 is positioned in the tank body 102 depicted distal to the lower end of the tank body 102. This is to allow for the longest time between refills of the tank body 102, thereby allowing the longest durations between refilling the tank body 102. In some embodiments, the pump 124 is secured to the tank bottom 114 by various fasteners or fitments. In some embodiments, the tank bottom 114 has a predetermined interior structure to secure the pump 124 to the tank bottom 114 without the use of adhesives or additional elements. In some embodiments, the pump 124 is secured to the tank bottom 114 through the use of adhesives or locking mechanisms. The pump 124 is connected to a battery (not shown) to provide adequate energy to power the pump 124.

The fastening means 111 is used to secure the solar panel mount 110 to the tank top 112. In various embodiments, screw 111 may be replaced with various fasteners or another releasable securement means.

Figure 6:
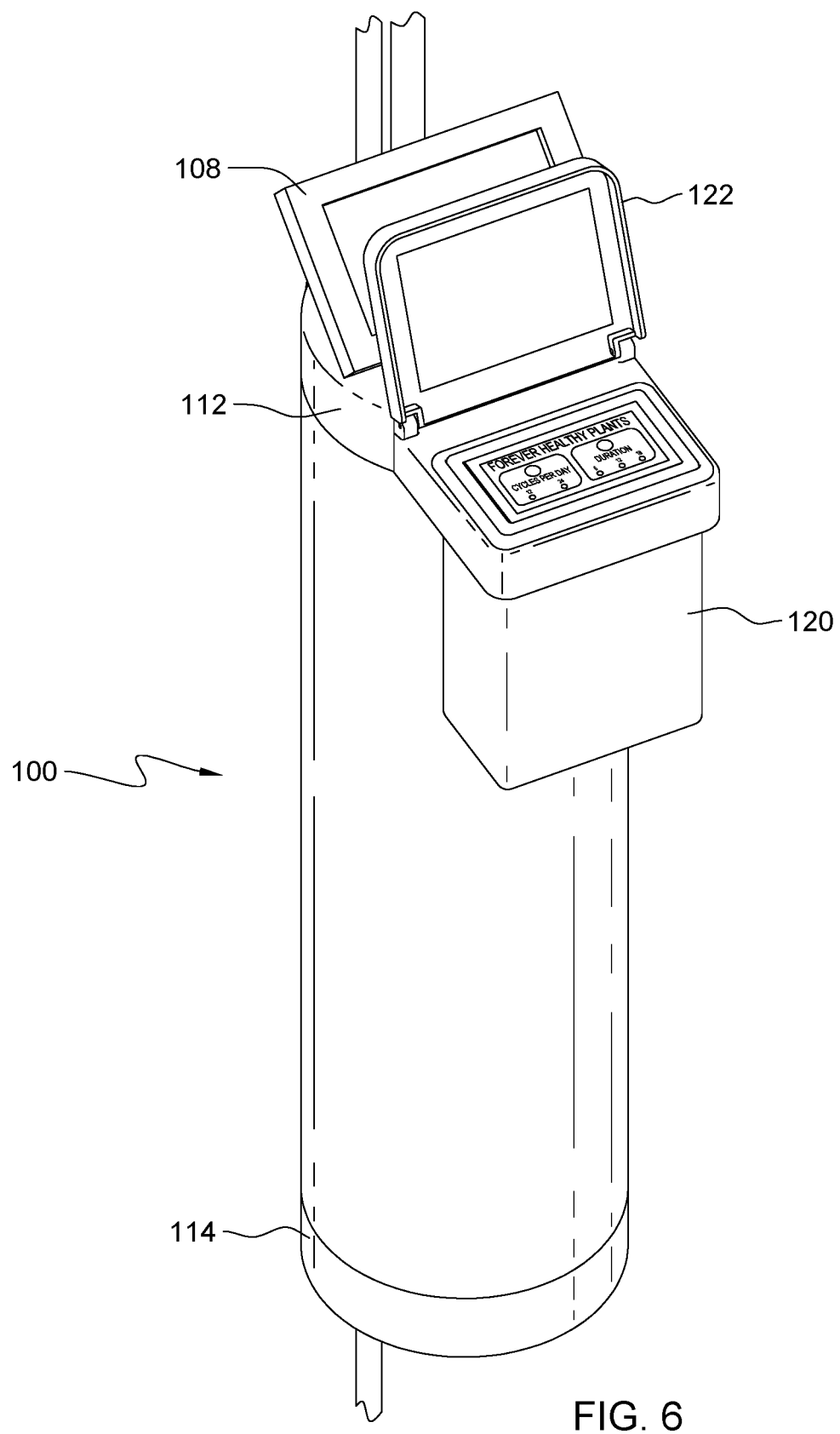
FIG. 6 depicts a perspective view of a user interface element of the watering apparatus, in accordance with an embodiment of the present invention.

FIG. 6 depicts a perspective view of a user interface element of the watering apparatus, in accordance with an embodiment of the present invention. The electrical component compartment 120 which is used to safely house the electrical components may have control panel as shown allowing the user to access various setting of the watering apparatus 100. In the depicted embodiment, the user can select the cycles per day and the duration of the cycles. In various embodiments, the controls may be modified or have additional features. In some embodiments, the watering apparatus 100 is controlled remotely and the compartment cover 122 is permanently secured over the electrical component compartment 120.

Figure 7:
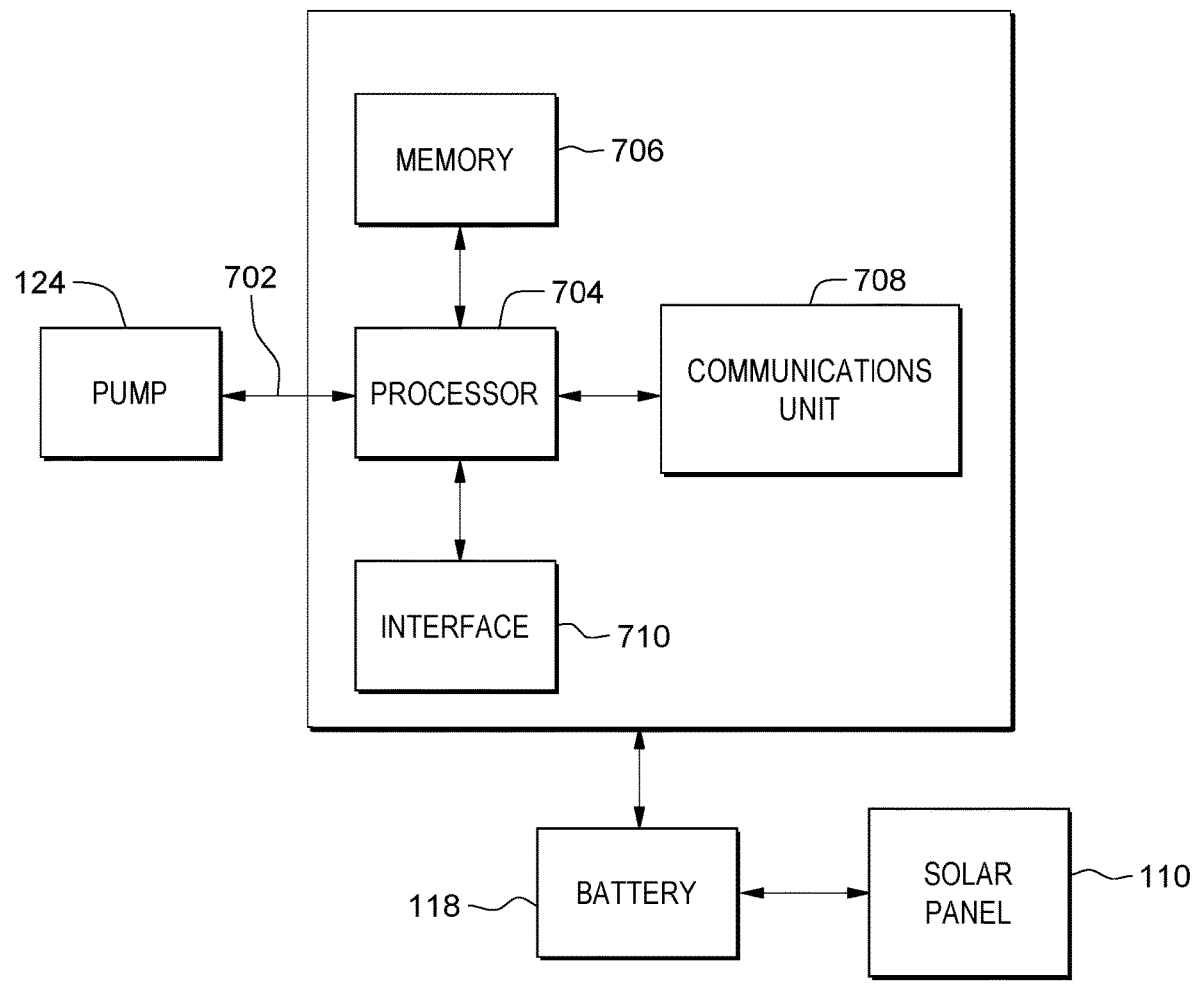
FIG. 7 depicts a diagram of electrical components of the watering apparatus, in accordance with an embodiment of the present invention.

FIG. 7 depicts a computing device 700, in accordance with an illustrative embodiment of the present invention. It should be appreciated FIG. 7 provides only an illustration of one implementation and does not imply any limitations with regard to the environments in which different embodiments may be implemented. Many modifications to the depicted environment may be made. Computing device 700 includes communications fabric 702, which provides communications between computer processor(s) 704, memory 706, communications unit 708, and input/output (I/O) interface(s) 710. The computing system 700 controls the timing of the watering, the interval of the watering, the quantity of the watering, the storing of the power from the solar panel 108 to the battery 128, the activation and deactivation of the pump 124. In additional embodiments, provided there is a water level gauge, the alerting to the water or liquid amount reaching a predetermined quantity. In additional embodiments, communicating with an external device this information.

Communications fabric 702 can be implemented with any architecture designed for passing data and/or control information between processors (such as microprocessors, communications and network processors, etc.), system memory, peripheral devices, and any additional hardware components within a system. For example, communications fabric 702 can be implemented with one or more buses.

Memory 706 is computer-readable storage media. In one embodiment, memory 706 includes random access memory (RAM). In general, memory 706 can include any suitable volatile or non-volatile computer-readable storage media. Memory 706 is stored for execution by one or more of the respective computer processors 704 of computing device 700 via one or more memories of memory 706. Memory 706 can include a magnetic hard disk drive, or a solid state hard drive, a semiconductor storage device, read-only memory (ROM), erasable programmable read-only memory (EPROM), flash memory, or any other computer-readable storage media that is capable of storing program instructions or digital information.

Communications unit 708, in the examples, provides for communications with other data processing systems or devices, including computing device 700. In the examples, communications unit 708 includes one or more network interface cards. Communications unit 708 may provide communications through the use of either or both physical and wireless communications links.

I/O interface(s) 710 allows for input and output of data with other devices that may be connected to computing device 700. For example, I/O interface 710 may provide a connection to external devices 416 such as a keyboard, keypad, camera, a touch screen, and/or some other suitable input device.

Battery 128 is connected to the computing device 700 to provide adequate power to allow the computing device 700 to operate. The battery is designed to store energy gathered by the solar panel 108. The battery 128 is rechargeable battery, such as, but not limited to, lithium-ion, lithium-ion polymer, nickel-metal hydride, or the like. The battery is sized to fit within the electrical component compartment 120, and also sized to provide enough energy to power the electrical and mechanical components of the watering apparatus 100.

Pump 124 is connected to the computing device 700 so when the predetermined requirements are met, the computing device 700 activates the pump 124 to water the plant(s).

The solar panel 108 is connected to the battery 128 to gather and convert the renewable energy to create a self-sustaining device.

In various embodiments, the elements of the watering apparatus, for example, but not limited to the tank bottom 114, the clamp 116, the tank body 102, the tank top 112, the clamp 118, the panel mount 110, the compartment 120, or the compartment cover 122 may be made from, but not limited to aluminum, steel, iron, copper, brass, bronze, zinc, stainless steel, polyolefins, styrenics, polypropylene, copolymer polypropylene, polystyrene, thermoplastic elastomers, thermoplastic elastomers, polyethylene, polypropylene, polystyrene, copolymer polypropylene, or other weather proof materials known to those of skill in the art.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The attachment means, may be, but not limited to adhesive, welding, or the like. In additional embodiments, the various elements are detachable from one another to allow for the person to replace the elements if broken or swapping out the clamp 116 and 118 for other models and sizes. The elements may de detachable as well for traveling purposes to create a compact design.

The invention is inclusive of combinations of the embodiments or embodiments described herein. References to "a particular embodiment" or "embodiment" and the like refer to features that are present in at least one embodiment of the invention. Separate references to "an embodiment" or "particular embodiments" or "embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention. The present invention shall be easily carried out by an ordinary skilled person in the art, and any modifications and changes are deemed to be within the scope of the present invention.

This written description uses examples to disclose the invention, including the best mode, and also to enable any person skilled in the art to practice embodiments of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A self-controlling watering system, comprising:
   a hollow chamber having a first end and a second end;
   a first cover designed to secured to the first end of the hollow chamber, wherein the first cover has at least a first opening, and a second opening;
   a second cover designed to secured to the second end of the hollow chamber;
   a pump secured within the hollow chamber;
   a hose of a predetermined length connected to the pump and extending through the first opening of the first cover;
   a renewable energy gathering device secured to the first cover distal to the first opening;
   a hollow compartment with one end open designed to securely fit within the second opening of the first cover;
   a battery positioned within the compartment and electrically connected to the renewable energy gathering device and the pump;
   a controller electronically connected to the pump and positioned above the battery within the hollow compartment for controlling the pump to initiate watering cycles; and
   a third cover secured to the first cover, wherein the second cover substantially covers the open end of the hollow compartment.

2. The self-controlling watering system of claim 1, wherein a seal between the first cover and the hollow chamber is a substantially water tight seal.

3. The self-controlling watering system of claim 1, further comprising a mount secured to the first cover and the renewable energy gathering device is secured to the mount.

4. The self-controlling watering system of claim 1, further comprising a nozzle attached to a second end of the hose.

5. The self-controlling watering system of claim 1, further comprising a securing mechanism integrated into the first cover and the second cover.

6. The self-controlling watering system of claim 1, further comprising a sensor connected to the renewable energy gathering device to detect the optimal position to maximize energy production.

7. The self-controlling watering system of claim 1, further comprising a sensor positioned within the hollow chamber, wherein the sensor detects the volume of liquid within the hollow chamber.

8. The self-controlling watering system of claim 1, wherein the first cover has a third opening.

9. A self-controlling watering system, comprising:
   a water reservoir having a first end, a second end;
   a first end cap having a set or openings, a hollow compartment, and an attachment means and the first end cap is secured to the first end of the water reservoir forming a substantially watertight seal, wherein the set of openings permit access to the water reservoir;
   a second end cap having an attachment means to the surface and secured to the second end of the water reservoir, wherein a substantially watertight seal is formed;
   a pump secured within the the water reservoir;
   a hose extending from one of the first set of openings and connected to the pump;
   an electrical system positioned within the hollow compartment comprising;
      a battery, and
      a controller, wherein the controller is connected to the battery and the pump and provides electricity to operate the pump;
   a renewable energy gathering device attached to the first end cap and electronically connected to the battery; and
   a cover rotatably attached to the first end cap and positioned to substantially cover the hollow compartment.

10. The self-controlling watering system of claim 9, further comprising a nozzle attached to the hose.

11. The self-controlling watering system of claim 9, further comprising a post which the first and second end cap attachment means affix to.

* * * * *